Figure 1:
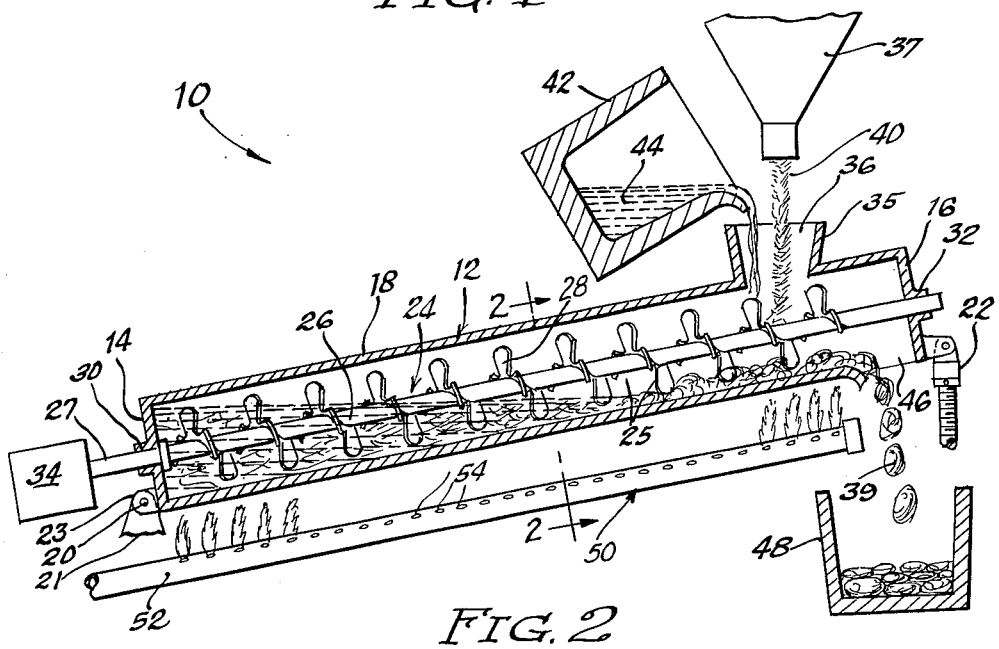

Nov. 19, 1963   P. A. LOCKWOOD   3,110,939
APPARATUS AND METHOD FOR THE PREPARATION OF POLYPHASE MATERIALS
Filed Oct. 3, 1957

INVENTOR.
Paul A. Lockwood
BY
Attorneys 3,110,939
APPARATUS AND METHOD FOR THE PREPARATION OF POLYPHASE MATERIALS
Paul A. Lockwood, Newark, Ohio, assignor to Owens-Corning Fiberglas Corporation, a corporation of Delaware
Filed Oct. 3, 1957, Ser. No. 688,051
4 Claims. (Cl. 22—1)

This invention relates to the preparation of polyphase systems, wherein one of the phases, preferably in the form of fibers or flakes, is uniformly distributed in the other phase to form a highly viscous mixture, and it relates more particularly to the preparation of polyphase systems of the type described embodying the combinations of metal and glass and to products produced from them.

The interest in polyphase systems is based upon the possibilities they offer of altering the physical characteristics of ordinary commercially available materials so they can be used to make products for which the material alone is not suitable because of a deficiency in one or more physical properties such as strength, rigidity, insulation, etc. The copending application Serial No. 219,111, filed April 3, 1951, describes polyphase systems formed of glass in glass, metal in glass, glass in ceramic, plastic in plastic, and like combinations of materials, one of which constitutes a continuous phase and another a fibrous phase uniformly distributed throughout the continuous phase, and it discusses some of the altered physical characteristics resulting from these polyphase mixtures.

In the copending applications Serial No. 485,862, filed February 3, 1955, now Patent 3,047,409, issued July 31, 1962, and Serial No. 555,528, filed December 27, 1955, now Patent 3,047,383, issued July 31, 1962, description is further made of such polyphase systems wherein the continuous phase is preferably formed of a metal, and the other phase is preferably formed of glass fibers or flakes or mixtures thereof.

Some of the altered physical characteristics resulting from the productions of such a combination of material as described in the aforementioned copending applications include increased strength derived from the presence of high strength fibers or flakes distributed even in small concentration in the continuous phase material. Improvement is experienced also in the flexure and impact stress of the formed material because of the ability of the fibrous phase, especially when formed of a material having a higher modulus of elasticity than the continuous phase, to intercept the forces causing the propagation of cracks, to arrest the crack and prevent breakage of the material.

One of the difficulties encountered in the preparation of polyphase systems of the types described resides in the difficulty of formulating the polyphase materials with a sufficient concentration of the fibrous phase and with a uniform distribution of fibers in the polyphase system. Such difficulties arise chiefly by reason of the fact that the addition of a fibrous phase to the material forming the continuous phase results in a rapid increase in the viscosity characteristics thereby to limit the amount of fibers that can be incorporated and thereby also to interfere with the ability of distributing the fibers uniformly throughout the mixture. These interferences make it difficult to produce compositions having uniform fiber concentrations from batch to batch or from product to product. Thus successful practice of the inventions described in the aforementioned copending applications depends upon the provision of simple and efficient means for effecting the desired combination of the fibrous phase with the continuous phase, wherein the fibrous phase is uniformly distributed throughout the continuous phase for producing a product wherein the amount of fiber or flakes in the polyphase system can be maintained at a relatively uniform concentration in cross section of the product, and from product to product. Failure to achieve such a uniform distribution of the fibrous phase would result in a product whose physical characteristics vary from point to point in an indeterminate manner.

It has been found that the heretofore objectionable increase in viscosity that results from the addition of the fibrous phase can be beneficially employed in the manufacture of polyphase systems for use. In the copending application, Serial No. 688,071 filed concurrently herewith and entitled "Glass-Metal Composites and Method for Preparation," description is made of the use of an inclined vibratory conveyor having its lower end portion in communication with the materials whereby the inclined vibratory conveyor is capable of effecting removal of polyphase materials when the viscosity has been increased by the addition of fibers or flakes to a level where the polyphase materials are incapable of return flow down the inclined conveyor. Thus, when the material reaches the desired viscosity, it is carried by the conveyor out of the system. Such materials will naturally have a uniform viscosity and such uniform viscosity presupposes a uniform concentration of fibers and a uniform distribution of fibers in the formed polyphase system. By increasing or decreasing the angle of incline, the viscosity characteristics of the material removed can be changed thereby to provide means for adjusting the concentration of fibers in the final product.

This invention is also based upon the beneficial use of the increase in viscosity occasioned by the addition of the fibrous or dispersed phase to effect removal of a finished product. Briefly described, use is made of an inclined type screw conveyor having its lower end portion in communication with a bath formed of the materials wherein the continuous phase is in a liquid state. As the dispersed phase of fibers or flakes is added to the fluid bath, the viscosity is materially increased. The combination of fiber addition and mixing action as effected by the operation of the screw of the conveyor, causes the fibers or flakes to become uniformly distributed with the continuous phase until such amounts are incorporated as would cause the polyphase material to be formed into a mass which is capable of being carried upwardly by the blades of the screw conveyor for removal from the bath. Such system, which is also based upon the build-up of viscosity to a formable mass, presupposes that such conditions are reached when the fiber or flake concentration reaches a predetermined level for the particular system under existing conditions. Thus the forces of viscosity build-up are again beneficially employed in a production process (continuous or batch) for the preparation of polyphase materials.

Thus it is an object of this invention to provide a method and apparatus for preparation of polyphase systems of the type described, and it is a related object to provide a method and apparatus for rapidly producing a highly viscous polyphase system of glass in metal wherein the glass is present in the form of fibers or flakes which are uniformly distributed in the metallic continuous phase.

Another object of this invention is to produce an apparatus of the type described for batch or continuous operation in the preparation of a highly viscous polyphase system.

A further object is to provide an apparatus for the preparation of polyphase systems of the type described which is rapid in operation, simple to use, and economical to make.

These and other objects and advantages of this invention will hereinafter appear and for purposes of illustration, but not of limitation, an embodiment of this invention is shown in the accompanying drawing wherein—

Figure 2:
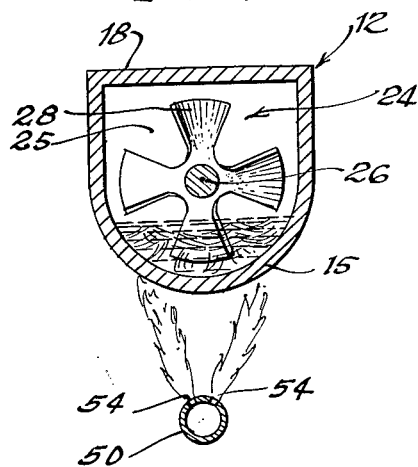

FIG. 1 is a schematic elevational view of an apparatus which may be employed in the practice of this invention, and FIG. 2 is a sectional view taken on the line 2—2 of FIG. 1 in the direction indicated.

The invention will hereinafter be described with reference to the combination of metal and glass wherein metal constitutes one of the continuous phases, and glass constitutes the dispersed phase either in the form of fibers and/or flakes, hereinafter referred to collectively as fibers. The glass fibers include continuous or discontinuous fibers in filament, strand or yarn form, as defined in the aforementioned applications Serial No. 219,111 and Serial No. 555,528. Glass flakes, which may be employed in the practice of this invention, as represented by thin flexible films of glass, are more fully defined in the aforementioned copending application Serial No. 485,862. It will be understood that the concepts of this invention can be employed in the preparation of others of the polyphase systems described in the aforementioned copending applications.

Referring now to FIG. 1 of the drawing, the apparatus for mixing highly viscous concentrations of uniformly distributed glass fibers in molten metal, indicated generally by the reference numeral 10, comprises an elongated container indicated generally by the reference numeral 12. The container is adapted to hold a mixture of liquid or molten metal and glass in the form of fibers and/or flakes, and is shaped like a trough with an arcuate bottom 15, end walls 14 and 16, and a top wall 18, see FIG. 2. The container is pivotally secured to a fixed support 21 by a pivot 20. This pivot extends through an opening in a lug 23 which is rigidly secured to the end wall 14. The container 12 is kept in an upwardly inclined position by a somewhat conventional adjustable support 22. One end of this support is connected to the container 12 at its upper end 16, and the other end of the support 22 is connected to a fixed support, not shown.

A somewhat conventional cut flight screw conveyor indicated generally by the reference numeral 24 is mounted in the container 12. This screw conveyor includes a central shaft 26 and integrally connected conveyor blades 28. These blades are mounted in uniformly spaced relation along a spiral path around shaft 26. This shaft is rotatably mounted in bearings 30 and 32 in the end walls of the container, and extends therethrough. A motor 34, secured by any conventional means to a fixed support (not shown) is connected to end 27 of shaft 26 for rotating the screw conveyor.

The top wall 18 of the container 12 adjacent end wall 16 is provided with an inlet opening 36 surrounded by upwardly projecting and diverging funnel-like flanges 35. A hopper 37 filled with glass fibers or flakes 40 is secured by any conventional means to a fixed support (not shown), and is mounted directly above the inlet opening 36, so that when glass is discharged from the hopper, it can fall through this opening into the container. One or more such hoppers may be employed for use in introducing fibers and flakes separately or simultaneously into the container. A ladle 42, adapted to be filled with molten metal 44, is similarly provided for either periodically or continually supplying additional metal to the container.

The arcuate bottom 15 of the container is provided with an additional downwardly directed discharge or outlet opening 46 adjacent the upper end wall 16 of the container. A vat 48 for collecting the glass-metal composite masses 39 is adapted to be mounted on a fixed support (not shown) directly beneath this opening. Alternatively, instead of collecting these masses, they may be immediately processed as by molding to a desired final stage, or they may be processed by rolling, extrusion, and the like to form billets, sheets, rods, tubes, wires, and the like of the material.

The entire apparatus may be mounted in a furnace (not shown) to keep the temperature of the mixture in the container above the melting point of the metal. In the alternative, heat may be applied to the container by a somewhat conventional heating means indicated generally by the reference numeral 50. This heating means may comprise a pipe 52 positioned in closely spaced parallel relationship to the container 12, and the pipe may include a plurality of uniformly spaced holes 54 through which an inflammable gas can be pumped. This gas may be ignited so that heat may be applied to the container 12 along its entire length.

In operation, the container 12 and the cut flight conveyor 24 are heated to a temperature above the melting point of the metal. Then molten metal 44 and glass fibers or flakes 40 are added to the container at a predetermined rate through the inlet opening 36. Since the rotating blades 28 in the cut flight conveyor are mounted in uniformly spaced relationship along a spiral path around the central shaft 26, the added material can pass through the openings 25 between the adjacent blades, and gravitate toward the bottom end wall 14 of the conveyor. In so doing, it is continuously stopped and mixed, as the uncut or long part of the spiral blades 28 hit this material. This continued mixing action produces highly viscous ball-like masses 39 of molten metal having inclusions of uniformly distributed glass fibers or flakes therein. These masses will continue to grow as long as additional glass fibers and molten metal are added to the housing. When these ball-like masses grow to a size larger than the spacing or opening 25 between the adjacent blades, they can no longer pass through them, whereupon they are rapidly moved up the length of the container and are pushed out of the outlet opening 46 at the upper end of the container by the rotating spirally mounted conveyor blades. For continuous operation, the rate at which the molten metal and glass fibers are added to the container must correspond to the rate at which the conveyor blades expel the composite material as ball-like masses from the container. Usually it is desirable to provide for a short residence in the mixer to effect the desired combination and distribution of the glass and metal, more time being allowed for higher glass content material than lower.

The adjustable support 22 provides a means for regulating the angle of inclination of the container. This is important because the effectiveness of the mixing action of the spiral blades 28 is inversely proportional to the speed the added metal and glass moves or gravitates toward the bottom of the container, and this speed depends upon the angle of inclination of the container. The highly viscous concentrations of glass fibers in molten metal require different amounts of mixing than the less viscous concentrations, and so the adjustable support 22 provides a convenient means for regulating the mixing action of the conveyor in accordance with the viscosity of the ball-like masses to be produced.

As the metallic component, use can be made of any metal such as lead, zinc, aluminum, etc. It is preferred to make use of a combination wherein the metallic component has a melting point which is below the melting point of the glass so as to enable the glass fibers or flakes to retain their form while in combination with the molten metal.

It will be understood that where the metal and fiber introduction interferes with the character and composition of the masses being displaced up the container or trough by the conveyor blades, the inlet opening 36 through which the fiber and melt are introduced into the container can be shifted downwardly towards the lower end of the housing.

Many uses can be made of the composite polyphase materials of the type produced by the practice of this invention. For example, the gobs or balls that are formed can be molded or rolled into sheets for use as a liner for space heaters or the like wherein the dimensional stability of the glass-metal composite minimizes such dimensional changes as have heretofore resulted in differential expansions and contractions between the liner and casing heretofore employed in space heaters. Such differential expansions and contractions responsive to the increase and decrease in temperature of the heater in use have resulted in the buckling of the parts and in the development of rumbling noises which have been characteristic of such space heaters.

Such composites as are formed with metallic lead and glass fibers can be used also in the construction of doors and panels especially where protection from radiation is desired. Composites of aluminum with glass fibers could be used as structural panels for walls, doors or roofing to effect a permanent structure of light weight, increased strength and resistance to warpage. These are but a few of the many applications that could beneficially be made of the metal and glass fiber or flake systems of the type produced by this invention. As previously pointed out, the composite materials may be processed or fabricated into articles as an additional operational step in combination with the composite forming apparatus when the composite is delivered in a plastic form directly from the apparatus to a fabricating means associated therewith. In the alternative, the composite polyphase material can be permitted to harden and later reheated to a plastic stage for fabrication into articles at a site removed from the composite material forming equipment. The action of the conveyor will operate to maintain the uniform distribution of the fibers in the continuous phase of metal during displacement from the bath and delivery to the collecting means.

As in the companion case the product of this system will have a relatively constant glass and metal ratio. Adjustment of the ratio can be made in a number of ways:

(1) The ratio can be changed by the adjustment of the angle of inclination of the trough. The higher the angle the higher the ratio of glass to metal.

(2) The ratio can be changed by a change in the angle of the screw with respect to the bottom of the trough. Again, the higher the angle the higher the ratio of glass.

(3) The ratio can be changed within limits by the size of the openings in the screw flight. Usually the larger the openings and the globules formed, the higher the glass content.

(4) The ratio is dependent somewhat upon the temperature of the metal. Again, the higher the temperature, the higher the ratio of glass.

The production capacity of the equipment can be controlled somewhat by elevational angle and length of trough, by the rate of rotation of the screw and by the size of the openings in the screw.

It will be understood that various changes may be made in the details of formulation and operation, and in the elements employed in processing without departing from the spirit of the invention, especially as defined in the following claims.

I claim:

1. A method for producing a metal product having inclusions of uniformly distributed glass, comprising the steps of adding the glass in dispersed form to molten metal to form a mixture, maintaining the temperature of the mixture above the melting point of the metal, causing the mixture to contact the lower portion of an upwardly inclined cut flight conveyor so that the mixture is stirred by the rotative action of the spaced spirally mounted conveyor blades, said stirring continued until highly viscous ball-like masses of molten metal having inclusions of uniformly distributed glass therein grow in the mixture, whereby these ball-like masses are quickly removed from the mixture after they grow to a predetermined size by the spaced spirally mounted rotating blades on the cut flight conveyor.

2. A method for continuously producing a metal product having inclusions of uniformly distributed glass fibers, comprising the steps of adding metal and glass fibers to a mixture of molten metal and glass at a predetermined rate, maintaining the temperature of the mixture above the melting point of the metal, causing the mixture to contact the lower portion of an upwardly inclined cut flight conveyor so that the mixture is stirred by the rotative action of the spaced spirally mounted blades, continuing the stirring of the mixture until ball-like masses of metal with uniformly distributed glass fibers therein are formed and grow to a size greater than the spacing between said spaced spirally mounted blades, and operating the cut flight conveyor at a rotative speed which causes the spaced spirally mounted conveyor blades to remove these ball-like masses from the remainder at the rate that the molten metal and glass fibers are added to the mixture to keep the supply constant.

3. An apparatus for producing a metal product having inclusions of uniformly distributed glass fibers therein, comprising in combination, a fixed support, an elongated upwardly inclined container having opposed end walls pivotally connected at one end to said fixed support, said container being adapted to hold a mixture of molten metal and glass therein and having at least one opening adjacent the upper end wall, means for heating the container to maintain the temperature of the mixture therein above the melting point of the metal, a cut flight screw conveyor including a central shaft with spaced spirally mounted blades thereon, the opposite ends of said central shaft being rotatably mounted in the opposed end walls of the container, means connected to said central shaft to rotate it whereby the mixture in the container is stirred until highly viscous ball-like masses of molten metal having inclusions of uniformly distributed glass fibers therein grow in the mixture and reach a size greater than the spacing between the spirally mounted blades whereupon they are moved up the length of the container and out of said opening by the rotating spirally mounted conveyor blades, and means for adjusting the angle of inclination of the container in accordance with the viscosity of the ball-like masses.

4. An apparatus for continuously producing a metal product having inclusions of uniformly distributed glass fibers therein, comprising a fixed support, an elongated upwardly inclined container having opposed end walls and a top wall pivotally connected at one end to said fixed support, said container being adapted to hold a mixture of molten metal and glass therein and having an inlet opening in the top wall of the container and an outlet opening at the bottom of the container adjacent the upper end wall, means for heating the container to maintain the temperature of the mixture therein above the melting point of the metal, means for adding metal and glass fibers to the inlet opening of the container at a predetermined rate, a cut flight screw conveyor including a central shaft with spaced spirally mounted blades thereon, the opposite ends of said central shaft being rotatably mounted in the opposed end walls of the container, means connected to said central shaft to rotate it whereby the mixture in the container is stirred until highly scous ball-like masses of molten metal having inclusions of uniformly distributed glass fibers therein grow in the mixture and reach a size greater than the spacing between the spirally mounted blades, whereupon they are moved up the length of the container and out of the outlet opening by the rotating spirally mounted conveyor blades, said means for adding metal and glass fibers to the inlet opening of the container being adjusted so the said predetermined rate corresponds to the rate the cut flight conveyor removes the ball-like masses from the mixture, and means for adjusting the angle of inclination of the container in accordance with the viscosity of the ball-like masses.

References Cited in the file of this patent
UNITED STATES PATENTS

| | | |
|---|---|---|
| 1,575,458 | Stonesifer | Mar. 2, 1926 |
| 1,996,082 | Powell | Apr. 2, 1935 |
| 2,436,771 | Hood | Feb. 24, 1948 |
| 2,709,075 | August | May 24, 1955 |